United States Patent
Crippa et al.

(10) Patent No.: US 12,422,007 B2
(45) Date of Patent: Sep. 23, 2025

(54) SPRING, SPRING ASSEMBLY AND BRAKE PAD, CALIPER BODY ASSEMBLY

(71) Applicant: Brembo S.p.A., Curno (IT)

(72) Inventors: Cristian Crippa, Curno (IT); Mauro Mambretti, Curno (IT)

(73) Assignee: Brembo S.p.A., Curno (IT)

( * ) Notice: Subject to any disclaimer, the term of this patent is extended or adjusted under 35 U.S.C. 154(b) by 274 days.

(21) Appl. No.: 17/937,536

(22) Filed: Oct. 3, 2022

(65) Prior Publication Data

US 2023/0109487 A1  Apr. 6, 2023

(30) Foreign Application Priority Data

Oct. 4, 2021 (IT) .................. 102021000025361

(51) Int. Cl.
| | |
|---|---|
| *F16D 65/097* | (2006.01) |
| *F16D 55/2265* | (2006.01) |
| *F16D 65/00* | (2006.01) |
| *F16D 55/00* | (2006.01) |
| *F16D 127/02* | (2012.01) |

(52) U.S. Cl.
CPC ..... *F16D 65/0977* (2013.01); *F16D 55/2265* (2013.01); *F16D 65/0068* (2013.01); *F16D 65/0972* (2013.01); *F16D 2055/0016* (2013.01); *F16D 2055/007* (2013.01); *F16D 65/0087* (2013.01); *F16D 2127/02* (2013.01)

(58) Field of Classification Search
CPC ............ F16D 65/0068; F16D 65/0087; F16D 65/0977; F16D 65/0972; F16D 2055/0016; F16D 2055/007; F16D 2127/02

USPC .................................. 188/73.36–73.38
See application file for complete search history.

(56) References Cited

U.S. PATENT DOCUMENTS

| | | | |
|---|---|---|---|
| 11,401,990 B2* | 8/2022 | D'Alessio | ............ F16D 55/226 |
| 11,773,932 B2* | 10/2023 | Fumagalli | ............. F16D 55/22 188/72.3 |
| 11,802,601 B2* | 10/2023 | D'Alessio | .......... F16D 65/0977 |

(Continued)

FOREIGN PATENT DOCUMENTS

| | | |
|---|---|---|
| DE | 102017204696 A1 | 9/2018 |
| JP | 2008032125 A | 2/2008 |

(Continued)

OTHER PUBLICATIONS

Italian Patent Office, Italian Search Report in Application No. IT202100025361, dated May 1, 2022, 8 pages.

*Primary Examiner* — Christopher P Schwartz
(74) *Attorney, Agent, or Firm* — Marshall & Melhorn, LLC

(57) ABSTRACT

A spring for a caliper body where the spring may be shaped to be arranged straddling a brake disc for applying an elastic action on at least one brake pad to bias it away from said brake disc. The spring may have a first thrust portion and a second thrust portion adapted to apply an elastic action on at least one brake pad, biasing the brake pad at least away from the brake disc. The spring may also have a first coupling portion adapted to couple the spring with a first side bridge. The spring may also have a second coupling portion adapted to couple the spring with the second side bridge on a tangentially opposite part with respect to the first coupling portion. The spring may also have a backing portion. The spring may also have at least one concave spring portion.

11 Claims, 11 Drawing Sheets

(56) References Cited

U.S. PATENT DOCUMENTS

2004/0262099 A1  12/2004  Crippa
2021/0270335 A1   9/2021  D'Alessio et al.

FOREIGN PATENT DOCUMENTS

| WO | 2019243958 A1 | 12/2019 |
| WO | 2020128710 A1 | 6/2020 |
| WO | 2020128946 A1 | 6/2020 |
| WO | 2021161642 A1 | 8/2021 |

* cited by examiner

SPRING, SPRING ASSEMBLY AND BRAKE PAD, CALIPER BODY ASSEMBLY

FIELD

The present invention relates to a spring for a disc brake braking device, a spring assembly and brake pad, and a brake caliper assembly.

BACKGROUND

In a disc brake, the brake caliper is generally arranged straddling the external peripheral margin of a brake disc, adapted to rotate about a rotation axis (X-X) defining an axial direction (A-A). In a brake disc, there are defined a radial direction (R-R) substantially orthogonal to said axial direction (A-A), a circumferential direction (C-C) orthogonal to both said axial direction (A-A) and said radial direction (R-R), and a tangential direction (T-T) locally, or rather punctually, i.e., in an intersection point of an axial and radial direction, orthogonal to both said axial direction (A-A) and said a radial direction (R-R). As known, disc brake discs comprise a bell adapted to associate the disc with a hub of a vehicle, from which an annular portion, referred to as a braking band, extends, which is intended to cooperate with brake pads of a caliper.

Disc brake springs are known which consist of a central portion and two end portions, in which the end portions rest against the pads to stress the pads elastically away from each other to ensure a separation of the pads from the brake disc after each braking operation.

The known springs are thus used to obtain a three-fold action:
- to reduce the vibrations of the pads;
- to distance the pads from the brake disc to reduce or eliminate a residual braking torque (residual torque) due to undesired contacts between the pads and the brake disc with the brake deactivated;
- to obtain uniform wear of the friction linings of the pads.

Usually, the known springs are kept in their operating position by fixing the central portion of the springs to the caliper.

In particular, the springs of the prior art generally comprise one or more connection appendages, formed at the central portion of the expansion spring, adapted to connect the springs to the caliper at coupling portions formed on the caliper. Usually, said coupling portions are made on the caliper body at least one connection bridge, made by casting with the caliper body, arranged straddling the brake disc and which connects a first elongated wheel side portion and a second elongated portion of the caliper body.

For example, document DE102017204696 shows a spring solution which includes only one connection appendage, which can be fixed to a side connection bridge of the caliper body, while documents WO2019/243958 and WO2020/128710, on the other hand, show spring solutions which include, in some embodiments, two connection appendages, which can be fixed to a side connection bridge and to a central connection bridge of the caliper body, respectively. These solutions involve connecting the spring to a side bridge of the caliper body, which allows a simple attachment to the caliper body and the pad. However, said solutions teach the use of at least one pair of springs to allow a balanced movement of at least one pad away from the brake disc, i.e., at least one first spring coupled to at least one first side bridge and a second spring coupled to at least one second side bridge, lengthening the time required for assembly and proper positioning of the springs on the caliper body. Additionally, in said solutions, the anchoring portions of the spring connected to the connection bridges made by casting with the caliper body, when subjected to high external stresses, may come out of their coupling seat, jeopardizing the operation of the spring itself.

Document WO2020/128946, instead, shows a spring solution, which involves a pair of side appendages configured to couple by snapping onto at least one central connection bridge of the caliper body. Despite allowing the use of a single spring to move the brake pad away from the brake disc in a balanced manner and providing a secure and durable connection of the spring to the caliper body, said solution makes the operations of assembling the spring to the caliper body and the maintenance operations of the brake pads and the brake caliper particularly time-consuming.

Therefore, the need is felt in the industry for pad return spring solutions which involve a small number of components and are easy to manufacture, while ensuring a secure and durable connection of the spring to a caliper body without central connection bridges.

Moreover, the springs of the prior art usually abut against an apical portion of the pads and, consequently, transmit a direct distancing force to the pads at the top of the pads, top which is understood as the radially external edge relative to the rotation axis of the brake disc.

In braking systems of the prior art, the correct positioning between the disc brake components, in particular between the spring and the brake pads, is entrusted to the friction forces which are generated by virtue of the elastic force, which can be generally broken down along the three spatial directions, which the spring applies as a result of its deformation on the support, i.e., the pad plate.

The value of these frictional forces depends on:
- the materials in contact which define the friction coefficient;
- the value of the exchanged spring elastic force.

If the system is subjected to external forces, e.g., vibrations or involuntary contact with an external agent or during maintenance of the caliper or a generic force external to the system, it breaks down along the two main directions which are parallel and perpendicular to the geometry in the contact zone.

The balance between the spring and the pad remains so if the friction forces developed, by virtue of the contact forces, are greater than the sliding forces of the spring on the pad.

Otherwise, the system is perturbed, taking itself to a new balance position different from the first one, which changes the dynamics of the forces exchanged with consequent impact on the functionality of the spring-pad assembly, altering the correct functionality of the braking system.

Therefore, the need is strongly felt to constrain the movement of the spring relative to the brake pad, when the spring-pad assembly is subject to external forces.

In particular, the need is still strongly felt to ensure that the position of the spring-pad contact point does not change as a result of external biases applied to the system.

SUMMARY

The aim of the present invention is to provide a spring, which allows a simple, secure, and durable connection to a caliper body without a central connection bridge, in which the connection of the spring to the caliper body does not change even as a result of external stresses applied to the system.

This and other purposes and advantages are achieved by a spring, a spring assembly and brake pad, and a brake caliper according to the claims.

Some advantageous embodiments are the subject of the dependent claims.

By virtue of the suggested solutions, it is possible to guarantee the use of a spring to move at least one brake pad away from a brake disc in a balanced manner, ensuring an extremely secure and durable connection of the spring to the side bridges of the caliper body compared to the prior art.

By virtue of the suggested solutions, it is possible to employ a spring to move at least one brake pad away from the brake disc in a balanced manner, in brake calipers having caliper bodies without cast central connection bridges.

By virtue of the suggested solutions, it is possible to provide a spring to move at least one brake pad away from the brake disc in a balanced manner, which has only three constraint zones to a brake caliper assembly.

By virtue of the suggested solutions, the need to guarantee that the position of the spring-pad contact point does not change even following external biases applied to the system is fulfilled directly by the concerned components by means of the introduction of geometric changes to the band spring.

For example, by obtaining the band spring through an industrial process of blanking, bending, etc., the desired requirements are achieved directly with the component concerned with the problem, i.e., the band spring, by virtue of a geometry such as to counteract the sliding force.

The object of such a geometry is to minimize the sliding component generated by the external force while at the same time maximizing the other component, i.e., the contact force which generates a further increase in the friction force compared to the current condition.

The desired effect is obtainable by means of the claimed band spring geometries which allow the invention to be adapted according to the substrate or zone on which the spring is to act.

All the disclosed solutions have the advantage of not biasing the functionality of the spring pad assembly and of creating a progressively increasing gap with the support as the latter advances with pad wear.

The suggested spring geometry does not affect the behavior of the spring itself because in working conditions the abutment portion never comes into contact with the support and on the contrary, tends to move away from it as wear advances. Indeed, the portion of the stop is used only during assembly to ensure that the spring is mounted correctly but then in operation must not interact with the support i.e., the plate not to risk biasing the functionality of the spring.

DESCRIPTION OF DRAWINGS

Further features and advantages of the band spring will become apparent from the description provided below of preferred exemplary embodiment thereof, given by way of non-limiting example, with reference to the accompanying drawings, in which.

DETAILED DESCRIPTION

Figure 1:
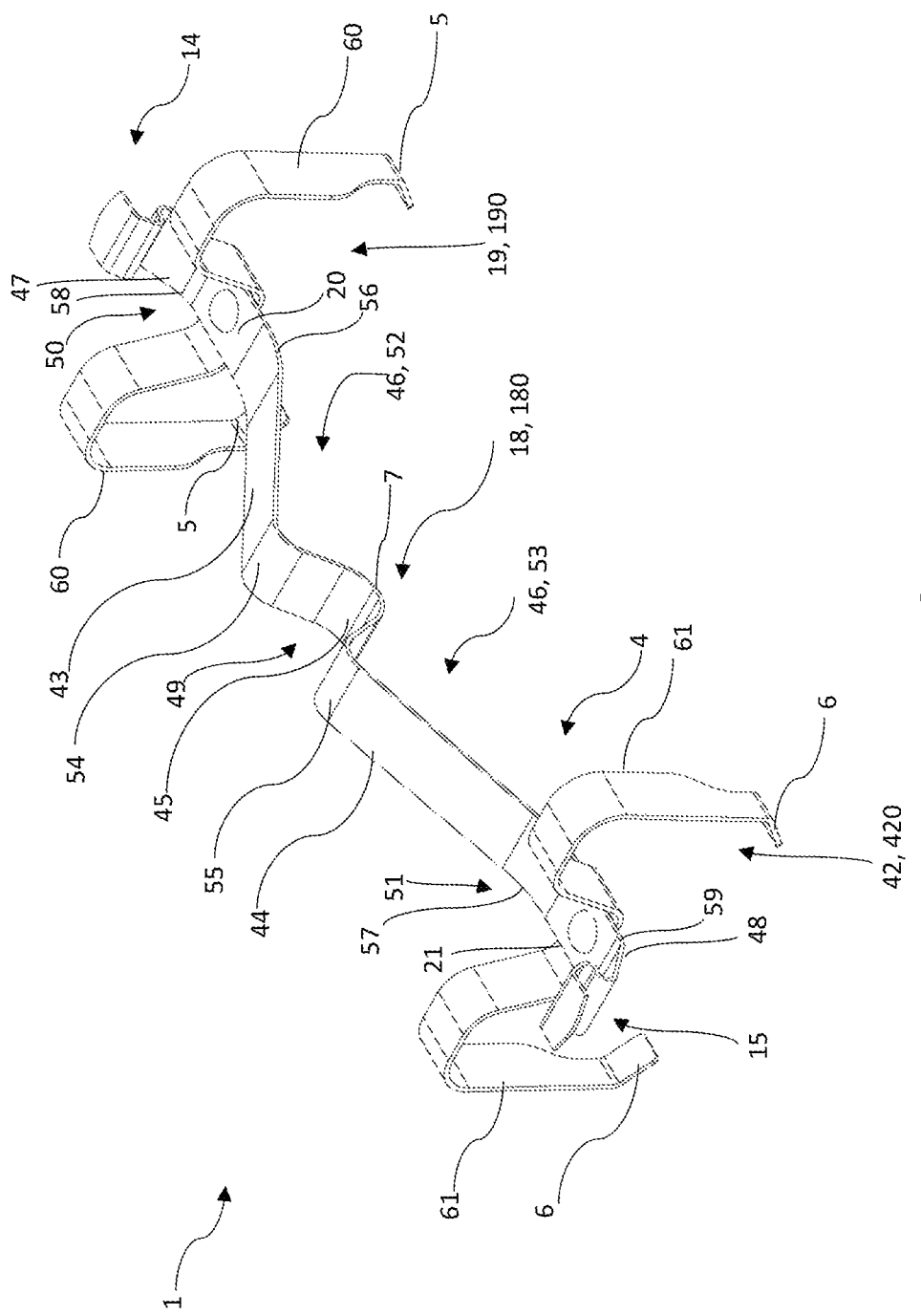
FIG. 1 shows a spring according to the present invention.
Figure 2:
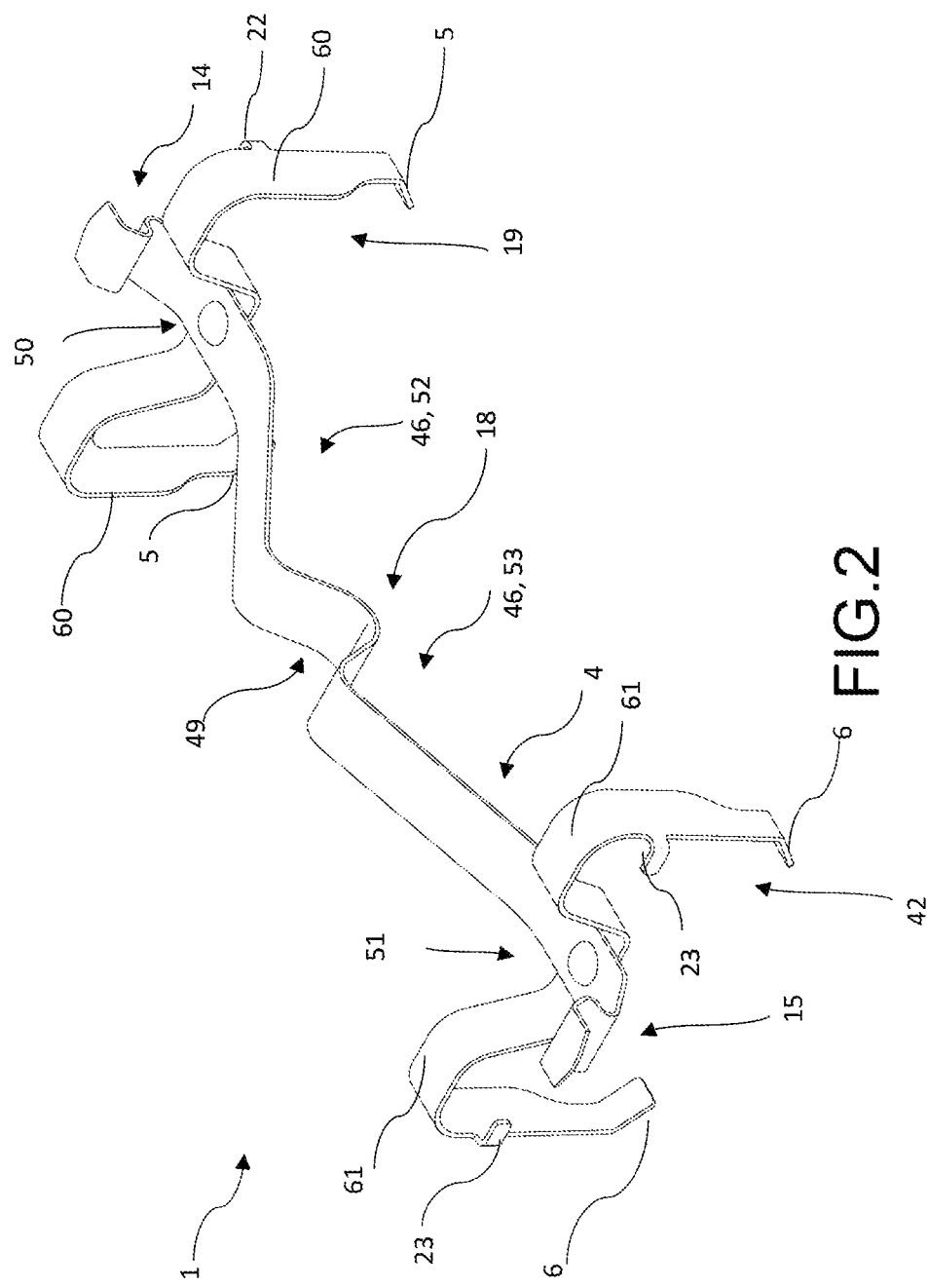
FIG. 2 shows a spring according to the present invention, in which spring abutment portions are present.
Figure 3:
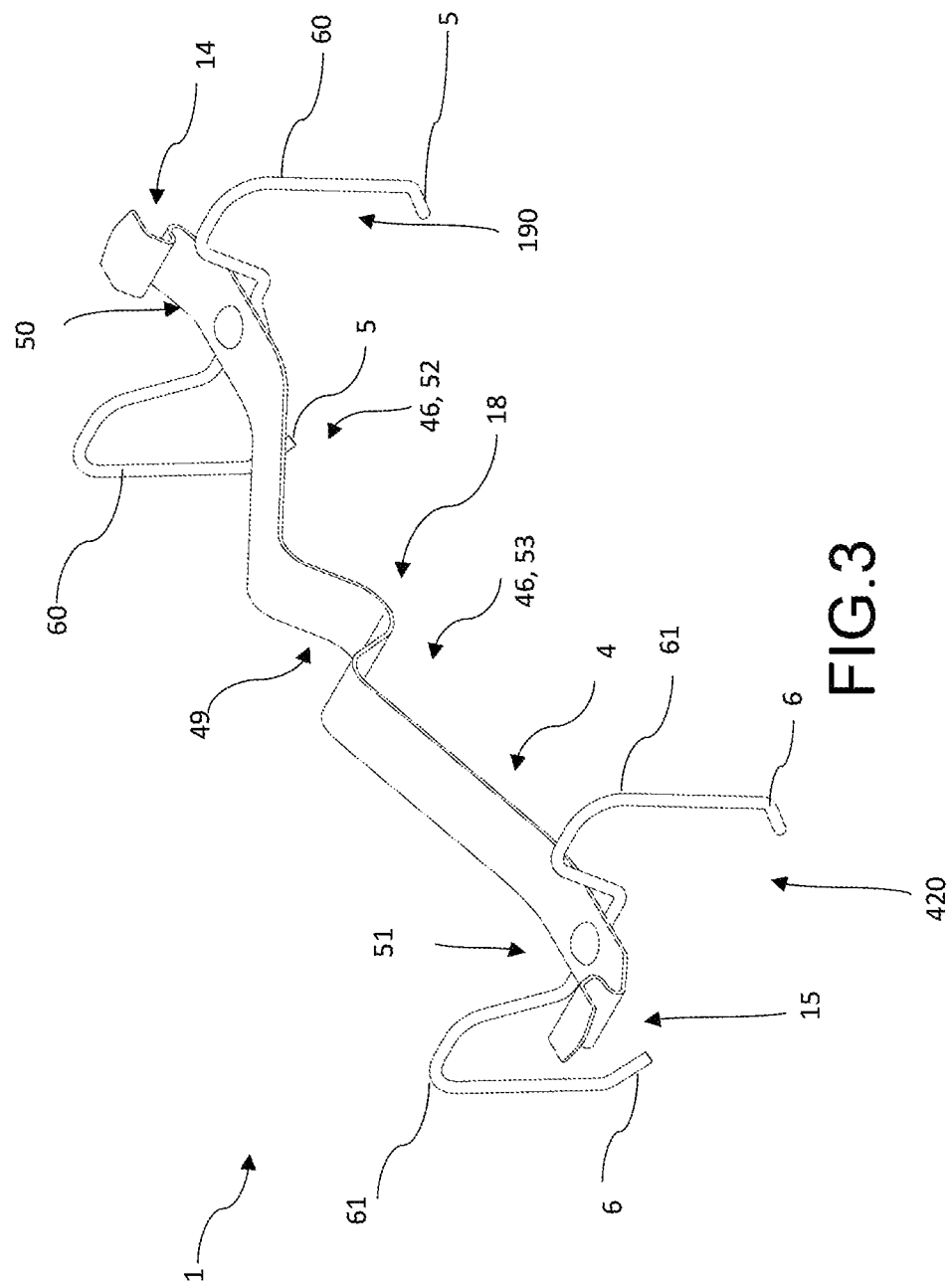
FIG. 3 shows a spring according to a further embodiment of the present invention comprising thread-like and ribbon-like portions.
Figure 4:
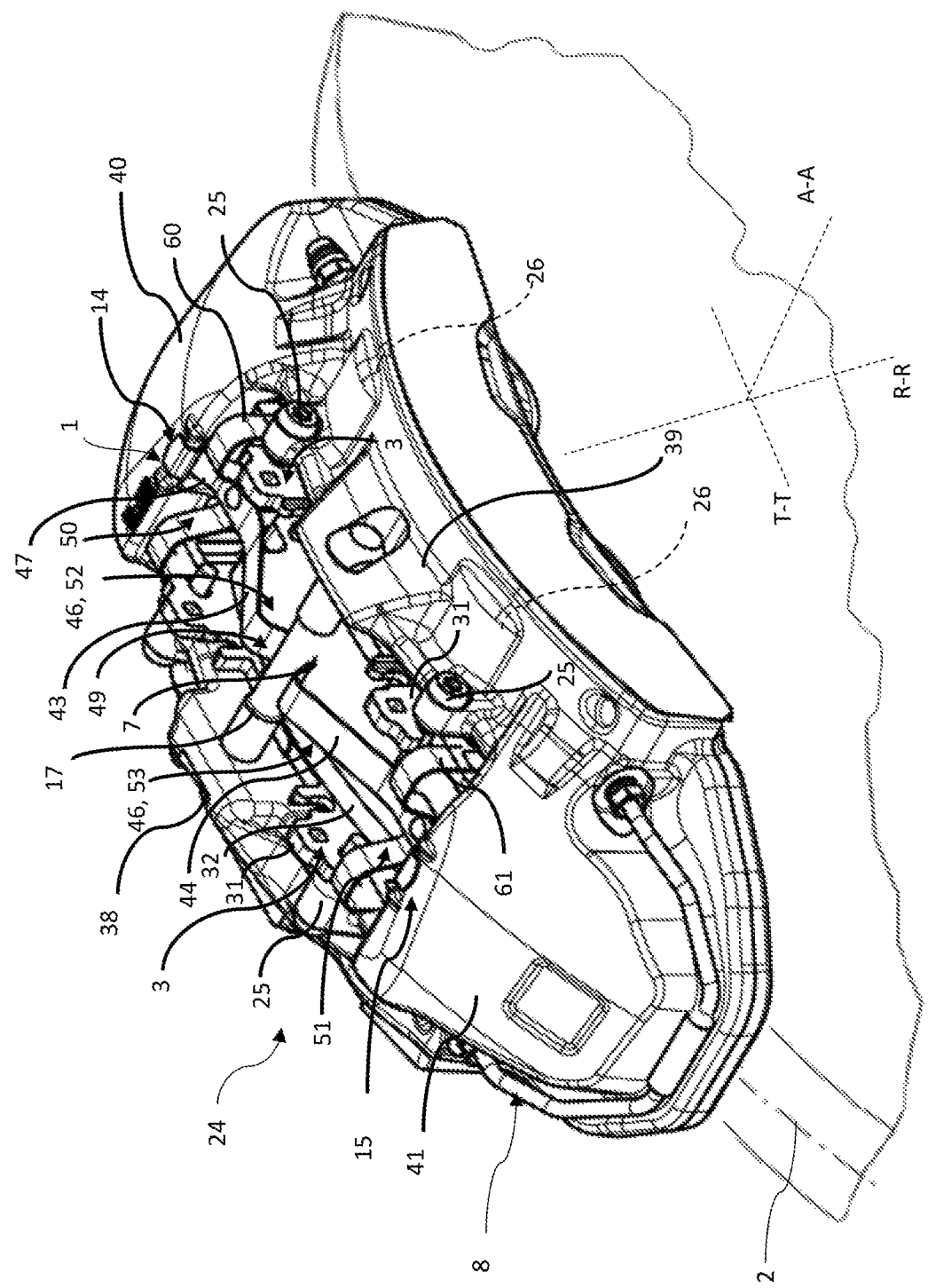
FIG. 4 shows an axonometric view of a brake caliper assembly comprising a brake caliper having a caliper tie-rod screwed to the caliper body, in which there is a spring assembly, according to the embodiment in FIG. 1, and pad according to the present invention, in particular, a spring interacting with two opposite brake pads.
Figure 5:
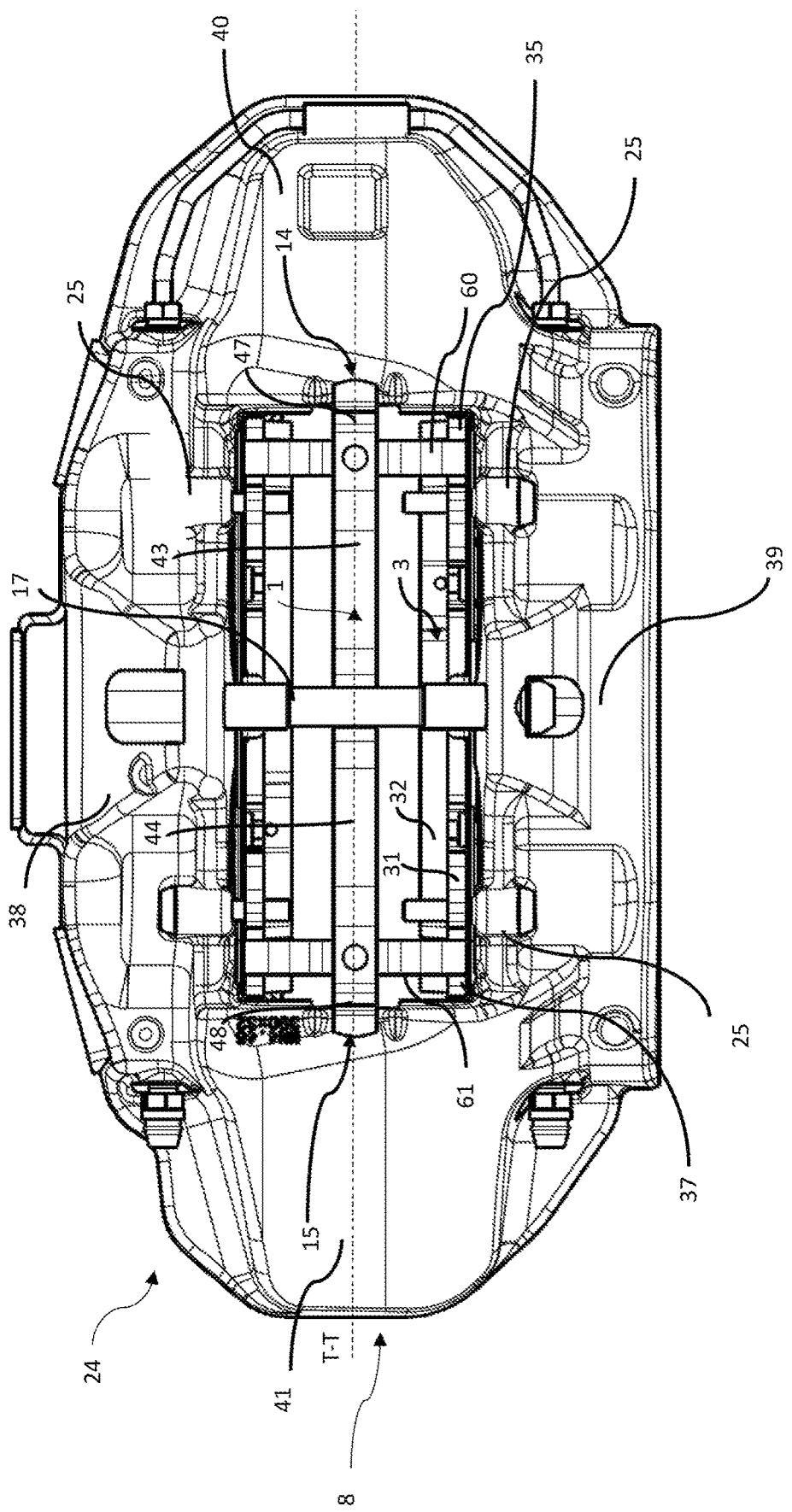
FIG. 5 shows a view from the top of the brake caliper in FIG. 4.
Figure 6:
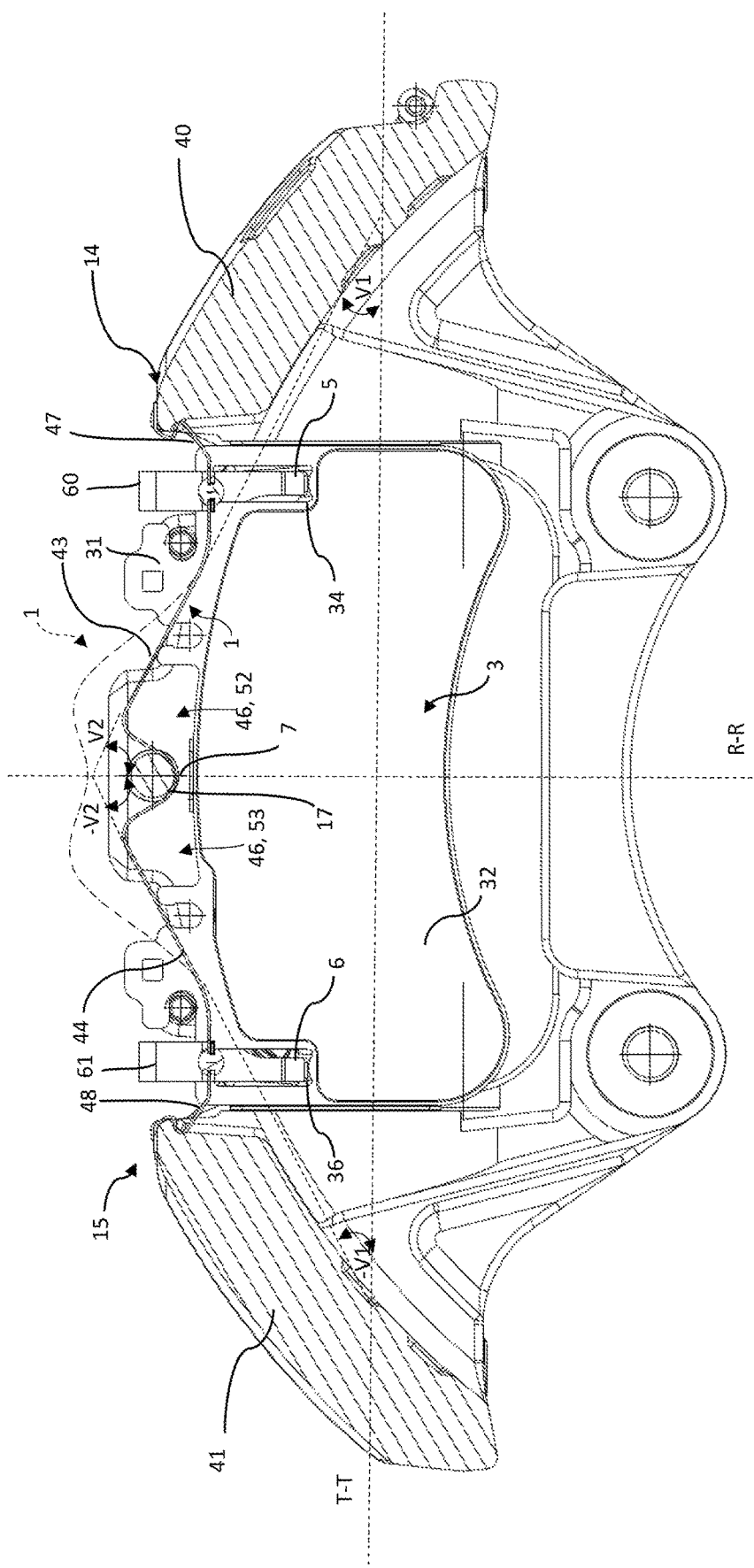
FIG. 6 shows a cross-section view of the brake caliper in FIG. 4, in which the interaction of the spring with the caliper body and caliper tie-rod is shown, in which the spring in a rest condition not abutting against the caliper tie-rod is shown with a dotted line.
Figure 7:
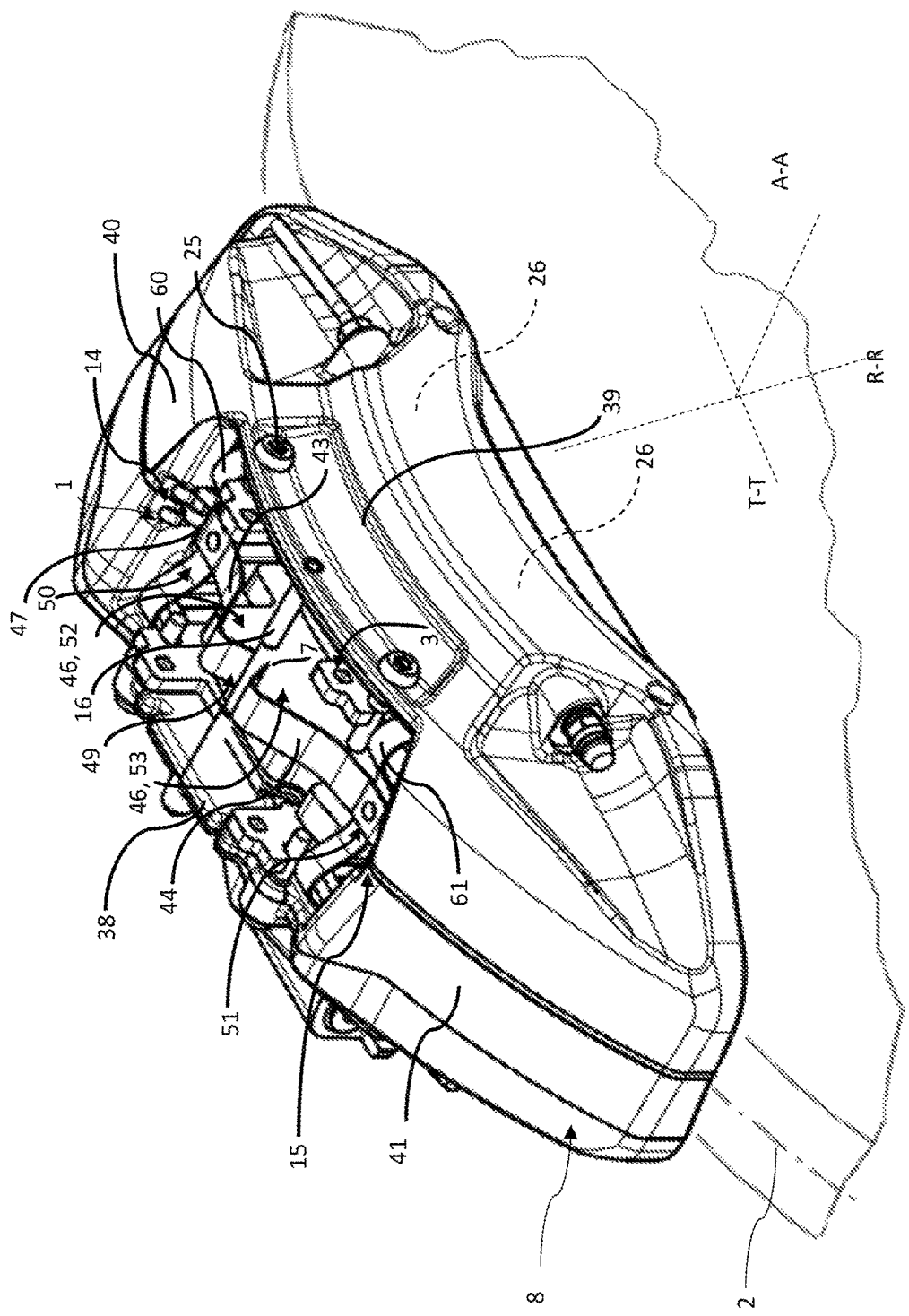
FIG. 7 shows an axonometric view of a brake caliper assembly comprising a brake caliper having a caliper pin planted into the caliper body, in which there is a spring assembly, according to the embodiment in FIG. 1, and pad according to the present invention, in particular, a spring which interacts with two opposite brake pads.
Figure 8:
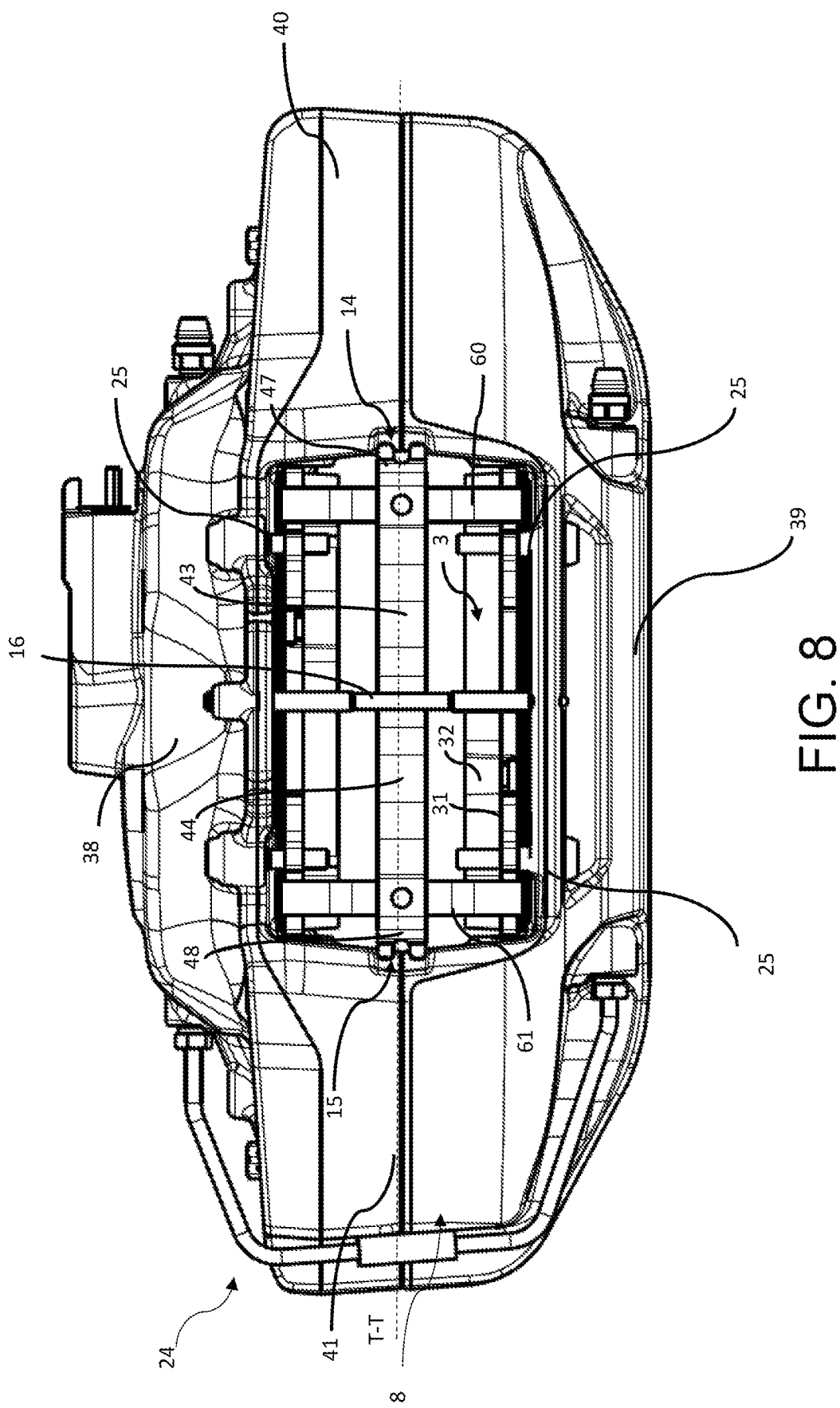
FIG. 8 shows a view from the top of the brake caliper in FIG. 7.
Figure 9:
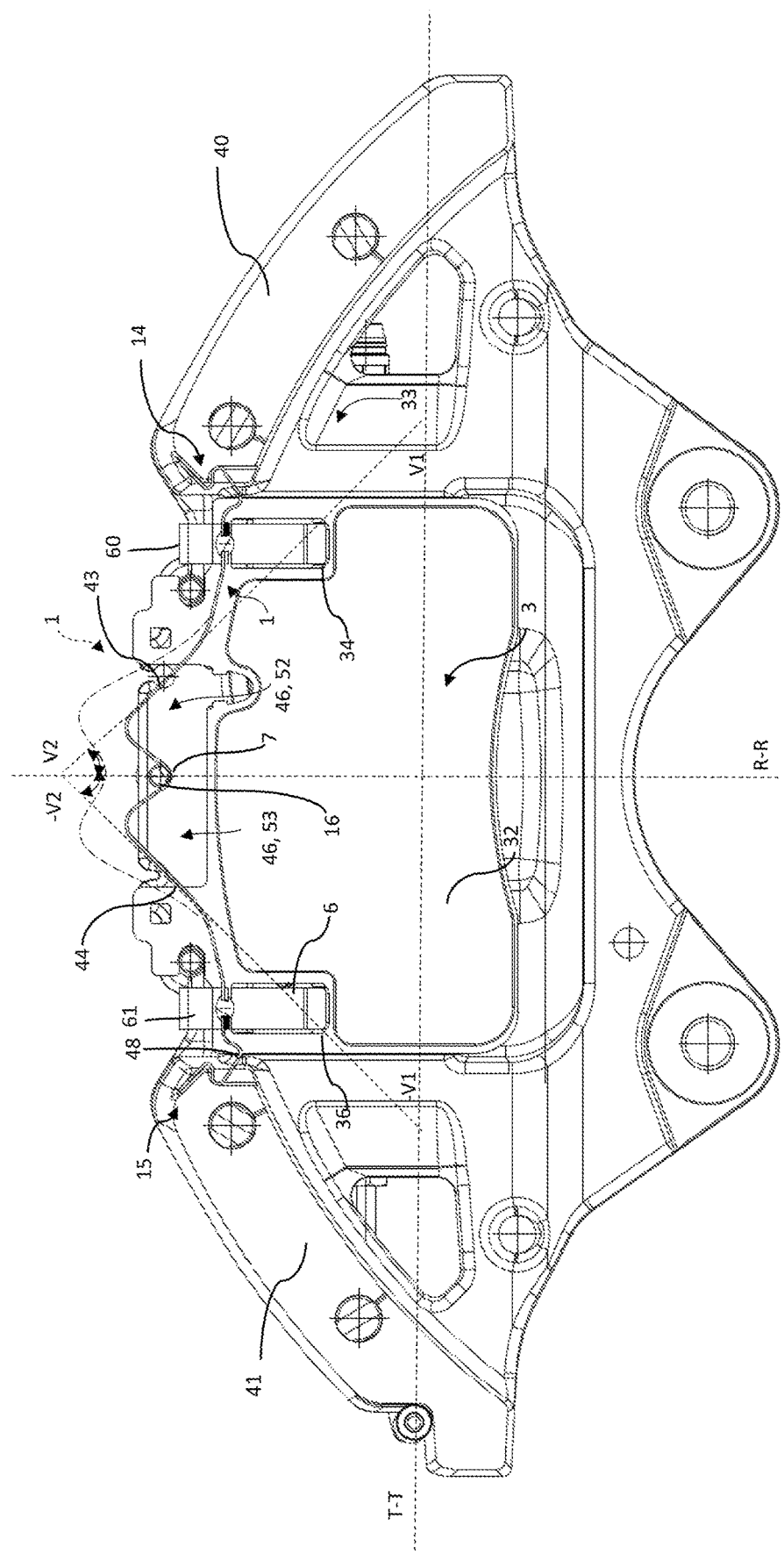
FIG. 9 shows a cross-section view of the brake caliper in FIG. 5, in which the interaction of the spring with the caliper body and the caliper pin rod is shown, in which the spring in a rest condition not abutting against the caliper pin is shown with a dotted line.
Figure 10:
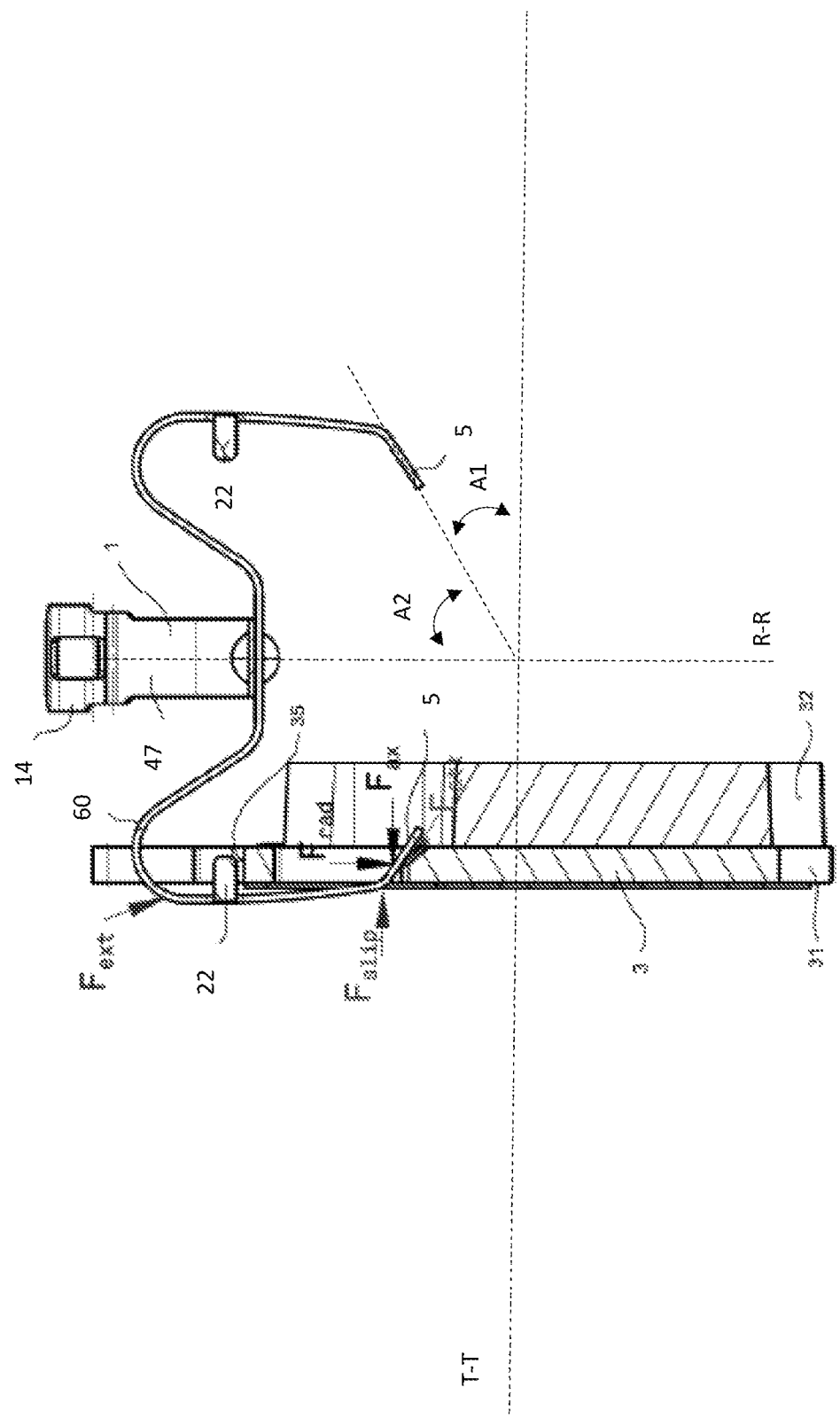
FIG. 10 shows in cross-section following a plane parallel to the rotation axis of the brake disc A-A and the radial direction R-R, a brake pad associated with a spring according to the invention at the beginning of an application of an external force Fext to the spring-brake pad assembly, in which a sliding force Fslip arises, which starts to alter the radial forces Frad and the axial forces Fax exchanged between spring and brake pad support plate, which generate the friction force Fatt, which maintains the balance between spring and pad.
Figure 11:
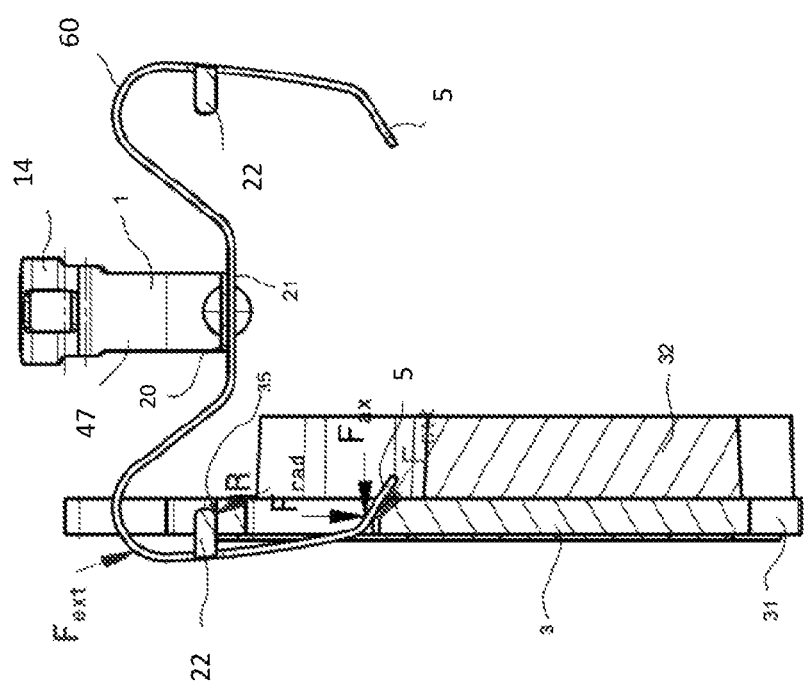
FIG. 11 shows a cross-section view of the brake pad in the same assembly as FIG. 10, in which the external force Fext has overcome the friction force Fatt and displaces the balance between the spring and the brake pad, balance which, however, is not altered by virtue of the abutment portion, i.e. a tongue, of the spring, which abuts against a backing portion of the supporting plate, which generates a constraint reaction R, which balances and cancels the effect of the external force Fext, allowing the optimal position between band spring and pad to be maintained.

According to a general embodiment, a spring 1 for a caliper body 8 is shaped to be arranged straddling a brake disc 2 to apply an elastic action on at least one brake pad 3 to bias it away from said brake disc 2.

Said brake disc 2 is adapted to rotate about a rotation axis X-X, which defines an axial direction A-A, parallel to said rotation axis X-X, a radial direction R-R, orthogonal to said rotation axis X-X, and a tangential direction T-T orthogonal both to said axial direction A-A and to said radial direction R-R.

Said at least one brake pad 3 comprises a support plate 31, which supports friction material 32, said support plate 31 comprising a plate edge 33, which forms at least one first plate thrust portion 34 and at least one second plate thrust portion 36.

Said band spring 1 comprises a band-shaped spring body 4.

Said caliper body 8 comprises a first elongated element or wheel side elongated element 38, a second elongated element or opposite wheel side elongated element 39, a first side bridge 40 and a second side bridge 41 adapted to connect said first elongated element 38 to said second elongated element 39 straddling said brake disc 2 and leaving a central portion of said caliper body 8 free from a central connection bridge.

Said spring 1 comprises a spring body 4.

Said spring 1 comprises a first thrust portion 5 adapted to apply said elastic action on said first plate thrust portion 34 of said at least one brake pad 3, biasing said brake pad 3 at least away from said brake disc 2 in axial direction A-A and radial direction R-R.

Said spring 1 comprises a second thrust portion 6 adapted to apply said elastic action on said second plate thrust portion 36 of said at least one brake pad 3, biasing said brake pad 3 at least away from said brake disc 2 in axial direction A-A and radial direction R-R. Said first thrust portion 5 and said second thrust portion 6 being diametrically opposed to apply said spring action in a balanced manner on said at least one brake pad.

Said spring 1 comprises a first coupling portion 14 adapted to couple said spring with said first side bridge 40.

Said spring 1 comprises a second coupling portion 15 adapted to couple said spring 1 with said second side bridge 41 on a tangentially opposite side with respect to said first coupling portion 14.

Said spring 1 comprises a backing portion 7 adapted to abut against a caliper pin 16 planted in said caliper body 8 or a caliper tie-rod 17 screwed to said caliper body 8 avoiding coupling with said caliper pin 16 or said caliper tie-rod 17.

Advantageously, said spring 1 comprises at least one concave spring portion 46 having a concavity facing towards said brake disc 2 so that at least said backing portion 7 is elastically movable in the radial direction R-R toward said brake disc 2 between a rest configuration and at least one work configuration, elastically stressing said first coupling portion 14 and said second coupling portion 15 along said tangential direction T-T in opposite directions.

Advantageously, in said work configuration, said backing portion 7 abuts against either said caliper pin 16 or said clamp tie-rod 17, stressing said first coupling portion 14 and said second coupling portion 15 against said first side bridge 40 and against said second side bridge 41, respectively.

According to an embodiment, said spring 1 comprises a first spring arm 43 adapted to connect said backing portion 7 to said first coupling portion 14. According to an embodiment, said first spring arm 43 is either filiform or band-like.

According to an embodiment, said spring 1 comprises a second spring arm 44 adapted to connect said backing portion 7 to said second coupling portion 15. According to an embodiment, said spring second arm 44 is either filiform or band-like.

According to an embodiment, said first spring arm 43 and said second spring arm 44 diverge from said backing portion 7 along first opposite directions, which are inclined relative to said tangential direction T-T and relative to said radial direction R-R forming said at least one concave spring portion 46.

According to an embodiment, said first spring arm 43 and said second spring arm 44 are arranged inclined relative to said axial direction A-A and also relative to said radial direction R-R.

According to an embodiment, said spring 1 forms a first angle V1 between said first spring arm 43 and said axial direction A-A and an opposite first angle −V1 between said second spring arm 44 and said axial direction A-A.

According to an embodiment, said spring 1 forms a second angle V2 between said first spring arm 43 and said radial direction R-R, and an opposite second angle −V2 between said second spring arm 44 and said radial direction R-R.

According to an embodiment, said spring 1 is shaped so that, in said work configuration, said backing portion 7 is constantly elastically biased in a radial direction R-R abutting against said caliper pin 16 or said caliper tie-rod 17 and so that said first coupling portion 14 and said second coupling portion 15 are constantly elastically biased in a tangential direction T-T against said caliper body 8.

According to an embodiment, the concavity of said at least one concave spring portion 46 decreases between said rest position and said work position.

According to an embodiment, said spring 1 comprises a third spring arm 47 adapted to connect said first spring arm 43 to said first coupling portion 14. According to an embodiment, said third spring arm 47 is either filiform or band-like.

According to an embodiment, said spring 1 comprises a fourth spring arm 48 adapted to connect said second spring arm 44 to said second coupling portion 15. According to an embodiment, said fourth spring arm 48 is either filiform or band-like.

According to an embodiment, said third spring arm 47 and said fourth spring arm 48 extend along second opposite directions, which are inclined relative to said tangential direction T-T and to said radial direction R-R.

According to an embodiment, at least said first spring arm 43 and said third spring arm 47 form a second convex spring portion 50 having concavity opposite to said at least one concave spring portion 46.

According to an embodiment, at least said second spring arm 44 and said fourth arm 48 form a third convex spring portion 51 having concavity opposite to said at least one concave spring portion 46.

According to an embodiment, the concavity of said second convex spring portion 50 and the concavity of said third convex spring portion 51 decrease between said rest position and said working position, biasing said first coupling portion 14 and said second coupling portion against said caliper body 8 from diametrically opposite sides.

According to an embodiment, said backing portion 7 is folded in a U or a V forming a first spring convex spring portion 49 having concavity opposite to said at least one concave spring portion 46 adapted to abut against said caliper pin 16 or said caliper tie-rod 17.

According to a first embodiment, said first convex spring portion 49 divides said at least one concave spring portion 46 into a first concave spring portion 52 and a second concave spring portion 53.

According to an embodiment, said spring 1 comprises a first folded portion 54 and a second folded portion 55, which are directly connected to said backing portion 7 on opposite sides along said tangential direction T-T forming at least one portion of said at least one concave spring portion 46.

According to an embodiment, said backing portion 7 comprises a radially external backing surface 45 facing in a radial direction R-R in a direction opposite to said brake disc 2, said radially external backing surface 45 being adapted to abut against said caliper pin 16 or said caliper tie-rod 17.

According to an embodiment, the concavity of said backing portion 7 folded in a U or a V, between said rest configuration and said work configuration, increases to tighten said backing portion 7 against said caliper pin 16 or said caliper tie-rod 17.

According to an embodiment, said first coupling portion 14 is shaped to couple by snapping onto said caliper body 8.

According to an embodiment, said second coupling portion 15 is shaped to couple by snapping onto said caliper body 8.

According to an embodiment, said first coupling portion 14 is shaped to couple with said caliper body 8 forming a bilateral constraint of said spring 1 to said caliper body 8.

According to an embodiment, said second coupling portion 15 is shaped to couple with said caliper body 8 forming a bilateral constraint of said spring 1 to said caliper body 8.

According to an embodiment, said spring 1 comprises a fifth spring arm 60 adapted to connect said first thrust portion 5 to said first coupling portion 14. According to an embodiment, said at least one fifth spring arm 60 is either filiform or band-like.

According to an embodiment, said spring 1 comprises least one sixth spring arm 61 adapted to connect said second thrust portion 6 to said second coupling portion 14.

According to an embodiment, said at least one sixth spring arm 61 is either filiform or band-like.

According to an embodiment, said spring 1 is constrained to said caliper body 8 with said first coupling portion 14 and said second coupling portion 15, and said spring 1 is constrained to said caliper pin 16 or to said caliper tie-rod 17 with said backing portion 7 exclusively forming three constraint zones.

According to an embodiment, said spring 1 comprises a plane of symmetry A-R, wherein said plane of symmetry A-R is perpendicular to said tangential direction T-T and symmetrically divides said spring 1 in half.

According to an embodiment, said first thrust portion 14 and said second thrust portion 15 are symmetrical to said backing portion 7.

According to an embodiment, said spring 1 comprises a first connection portion 20 from which said first spring arm 43 and said third spring arm 47 distance themselves, in which at least one fifth spring arm 60 is connected to said first connection portion 20 supporting said first thrust portion 5 so as to be placed orthogonal to said first spring arm 43 and to said third spring arm 47.

According to an embodiment, said spring 1 comprises a second connection portion 21 from which said second spring arm 44 and said fourth spring arm 48 distance themselves, wherein at least one sixth spring arm 61 is connected to said second connection portion 21 supporting said second thrust portion 6 to be placed orthogonal to said second spring arm 44 and to said fourth spring arm 48.

According to an embodiment, said at least one fifth spring arm 60 and said at least one sixth spring arm 61 are folded U or a V.

According to an embodiment, said spring 1 comprises a further first thrust portion 5 adapted to bias a further brake pad 3 away from said brake disc 2, wherein said at least one fifth spring arm 60 connects said further first thrust portion 5 to said first coupling portion 14.

According to an embodiment, said spring 1 further comprises a second thrust portion 6 adapted to bias said further brake pad 3 away from said brake disc 2, wherein said at least one sixth spring arm 61 connects said further second thrust portion 6 to said second coupling portion 15.

According to an embodiment, said at least one fifth spring arm 60 is shaped with two branches bent in a U or V shape, and in which said at least one sixth spring arm 61 is shaped with two branches bent in a U or V shape.

According to an embodiment, said first thrust portion 5 and said second thrust portion 6, when in operating conditions resting on said at least one pad 3, is arranged inclined relative to said axial direction A-A and also relative to said radial direction R-R, forming a predetermined angle A1 between said first thrust portion 5 or said second thrust portion 6, and said axial direction A-A and forming a predetermined angle A2 between said first thrust portion 5, or said second thrust portion 6, and said radial direction R-R.

According to an embodiment, said spring body 4 comprises at least one filiform spring body portion.

According to an embodiment, said spring body 4 is filiform.

According to an embodiment, said spring body 4 comprises at least one band-shaped portion.

According to an embodiment, said spring body 4 is completely band-shaped and is obtained from a shaped and bent blanked sheet of predetermined spring thickness 9, which forms a spring edge 10.

According to an embodiment, said spring body 4 is band-shaped and obtained from a blanked and shaped sheet of spring steel.

According to an embodiment, said spring 1 is a band spring, in which said plate edge 33 forms at least said first plate thrust portion 34 and at least one different first plate backing portion 35. Said spring 1 comprises at least one first abutment portion 22. Said first abutment portion 22 is adapted to abut against said first plate backing portion 35 of said at least one brake pad 3 forming a support on an area of said first plate backing portion 35 which prevents any sliding of said first thrust portion 5 when the spring 1 is subject to external actions. In particular, said band spring 1 is prevented from permanently coupling with said at least one pad 3, avoiding a bilateral constraint in said first thrust portion 5 and said first abutment portion 22 between said spring 1 and said at least one pad 3.

According to an embodiment, said spring 1 is a band spring, wherein said plate edge 33 forms at least said second plate thrust portion 36 and at least one different second plate backing portion 37. Said spring 1 comprises at least one second abutment portion 23.

Said second abutment portion 23 is adapted to abut against said second plate backing portion 37 of said at least one brake pad 3 forming a support on an area of said second plate backing portion 37 which prevents any sliding of said second thrust portion 6 when the spring 1 is subject to external actions. In particular, said band spring 1 is prevented from permanently coupling with said at least one pad 3, avoiding a bilateral constraint in said second thrust portion 6 and said second abutment portion 23 between said spring 1 and said at least one pad 3.

According to an embodiment, said spring body 4 comprises at least said first coupling portion 14, said backing portion 7 and said second coupling portion 15.

According to an embodiment, said spring body 4 comprises a second spring body band 19 comprising at least said one first thrust portion 5.

According to an embodiment, said spring body 4 comprises a third spring body band 42 comprising at least said second thrust portion 6.

According to an embodiment, said second spring body band 19 and said third spring body band 42 are connected to said first spring body band 18, to arrange said first thrust portion 5 and said second thrust portion 6 orthogonal with respect to said first coupling portion 14, said backing portion 7 and said second coupling portion 15.

According to an embodiment, said spring body 4 comprises a first spring body band 18 comprising at least said first coupling portion 14, said backing portion 7 and said second coupling portion 15. Said first spring body band 18 is band-shaped.

According to an embodiment, said spring body 4 comprises a first spring body thread 180 comprising at least said first coupling portion 14, said backing portion 7, and said second coupling portion 15. Said first spring body thread 180 is filiform.

According to an embodiment, said spring body 4 comprises a second spring body thread 190 each comprising at least one first thrust portion 5. Said second spring body thread 190 is filiform.

According to an embodiment, said spring body 4 comprises a third spring body thread 420 each comprising at least said second thrust portion 6. Said third spring body thread 420 is filiform.

According to an embodiment, said second spring body thread 190 and said third spring body thread 420 are connected to said first spring body band 18, so as to arrange said first thrust portion 5 and said second thrust portion 6 orthogonal with respect to said first coupling portion 14, to said backing portion 7 and to said second coupling portion 15.

According to an embodiment, said second spring body thread 190 and said third spring body thread 420 are connected to said first spring body band 180, so as to arrange said first thrust portion 5 and said second thrust portion 6 orthogonal with respect to said first coupling portion 14, to said backing portion 7 and to said second coupling portion 15.

According to an embodiment, said first abutment portion 22 extends cantilevered from said spring body 4.

According to an embodiment, said second abutment portion 23 extends cantilevered from said spring body 4.

According to an embodiment, said first abutment portion 22 comprises opposite first abutment portion flat faces 11, 12 and a first abutment portion edge 13, and said first abutment portion 22 rests abutting against said first plate backing portion 35 with one of said opposite first abutment portion flat faces 11 or 12.

According to an embodiment, said first abutment portion 22 comprises opposite first abutment portion flat faces 11, 12 and a first portion abutment edge 13, and said first abutment portion 22 rests abutting against said first backing portion plate 35 with said first abutment portion edge 13.

According to an embodiment, said second abutment portion 23 comprises opposite second abutment portion flat faces 27, 28 and a second abutment portion edge 29, and said second abutment portion 23 rests abutting against said second plate backing portion 37 with one of said opposite second abutment portion flat faces 27 or 28.

According to an embodiment, said second abutment portion 23 comprises opposite second abutment portion flat faces 27, 28 and a second abutment portion edge 29, and said second abutment portion 23 rests abutting against said second plate backing portion 37 with said second abutment portion edge 29.

According to an embodiment, said first abutment portion 22, when it rests abutting against said plate backing portion 35 is stressed to bend.

According to an embodiment, said second abutment portion 23, when it rests abutting against said plate backing portion 37 is stressed to bend.

According to an embodiment, said first abutment portion 22 extends cantilevered from at least one fifth spring arm 60.

According to an embodiment, said third abutment portion 23 extends cantilevered from at least one sixth spring arm 61.

The present invention further relates to a spring assembly and brake pad comprising at least one spring 1 according to any one of the embodiments described above and at least one brake pad 3.

The present invention further relates to a brake caliper assembly comprising at least one spring 1 according to any one of the embodiments described above and at least one brake pad 3.

Said brake caliper assembly comprises a brake caliper 24 comprising a caliper body 8 adapted to be arranged straddling a brake disc 2, said brake disc 2 being adapted to rotate about a rotation axis X-X, which defines an axial direction A-A, parallel to said rotation axis X-X, a radial direction R-R, orthogonal to said rotation axis X-X, and a tangential direction T-T orthogonal both to said axial direction A-A and to said radial direction R-R.

Said caliper body 8 comprises a first elongated element or wheel side elongated element 38, a second elongated element or opposite wheel side elongated element 39, a first side bridge 40, and a second side bridge 41 adapted to connect said first elongated element 38 to said second elongated element 39 to straddle said brake disc 2, leaving a central portion of said caliper body 8 free from a central connection bridge, and wherein said caliper body comprises seats adapted to support thrust elements or pistons 26 configured to stress said at least one pad towards said brake disc 2.

Said caliper assembly comprises at least one pad sliding and support pin 25 connected to said caliper body and supporting said at least one brake pad 3.

Said caliper assembly comprises a supporting assembly caliper pin 16 planted in said caliper body 8 in said central portion of caliper body 8 between said first elongated element 39 and said second elongated element 39, or said caliper assembly comprises a caliper tie-rod 17 screwed into said caliper body 8 in said central portion of caliper body 8 between said first elongated element 39 and said second elongated element 39.

Said spring 1 has said backing portion 7 abutting against said caliper pin 16 or said caliper tie-rod 17 and stressed in a radial direction (R-R).

Said spring 1 has said first coupling portion 14 and said second coupling portion 15 coupled with said first side bridge 40 and said second side bridge 41 and a tangential direction T-T against said first side bridge 40 and against said second side bridge 41 respectively, avoiding interactions of said spring 1 with each pad support and sliding pin 25.

According to an embodiment, said caliper assembly avoids interactions of said spring 1 with each pad supporting and sliding pin 25.

LIST OF REFERENCES 1 band spring
2 brake disc
3 brake pad
3' further brake pad
4 spring body
5 first thrust portion
6 second thrust portion
7 backing portion
8 caliper body
9 spring thickness
10 spring edge
11 first abutment portion flat face
12 first abutment portion flat face 13 first abutment portion edge
14 first coupling portion
15 second coupling portion
16 caliper pin
17 caliper tie-rod
18 spring body first band
19 spring body second band
20 first connection portion
21 second connection portion
22 first abutment portion
23 second abutment portion
24 brake caliper
25 pad supporting and sliding pins
26 thrust elements or pistons
27 second abutment portion flat face
28 second abutment portion flat face
29 second abutment portion edge
30 boss-shaped protuberance
31 backing plate
32 friction material
33 plate edge
34 first plate thrust portion
35 first plate backing portion
36 second plate thrust portion
37 second plate backing portion
38 first elongated element or wheel side elongated element
39 second elongated element or opposite wheel-side elongated element
40 first side bridge
41 second side bridge
42 third spring body band
43 first spring arm
44 second spring arm
45 radially external backing surface
46 at least one concave spring portion
47 third spring arm
48 fourth spring arm
49 first convex spring portion
50 second convex spring portion
51 third convex spring portion
52 first concave spring portion
53 second concave spring portion
54 first bent spring portion
55 second bent spring portion
56 third bent spring portion
57 fourth bent spring portion
58 fifth bent spring portion
59 sixth bent spring portion
60 fifth spring arm
61 sixth spring arm
180 first spring body thread
190 second spring body thread
420 third spring body thread
X-X rotation axis or revolution axis of an axial-symmetrical surface
A-A axial direction
R-R radial direction
T-T tangential direction
C-C circumferential direction
A1 angle between first or second thrust portion and axial direction
A2 angle between first or second thrust portion and radial direction
V1 angle between first or second spring arm in axial direction
V2 angle between first or second spring arm in radial direction

The invention claimed is:

1. A spring for a caliper body wherein said spring is shaped to be arranged straddling a brake disc for applying an elastic action on at least one brake pad to bias it away from said brake disc; wherein
   said brake disc is adapted to rotate about a rotation axis, which defines an axial direction, parallel to said rotation axis, a radial direction, orthogonal to said rotation axis, and a tangential direction orthogonal both to said axial direction and to said radial direction;
   said at least one brake pad comprises a support plate, which supports friction material, said support plate comprising a plate edge forming at least one first plate thrust portion and at least one second plate thrust portion;
   said caliper body comprising a first elongated element or wheel side elongated element, a second elongated element or opposite wheel side elongated element, a first side bridge and a second side bridge adapted to connect said first elongated element to said second elongated element straddling said brake disc and leaving a central portion of said caliper body free from a central connection bridge,
   said spring comprises a spring body;
   said spring comprising:
   a first thrust portion adapted to apply said elastic action on said first plate thrust portion of said at least one brake pad, biasing said brake pad at least away from said brake disc in an axial direction and in a radial direction;
   a second thrust portion adapted to apply said elastic action on said second plate thrust portion of said at least one brake pad, biasing said brake pad at least away from said brake disc in an axial direction and in a radial direction;
   a first coupling portion adapted to couple said spring with said first side bridge;
   a second coupling portion adapted to couple said spring with said second side bridge on a tangentially opposite side with respect to said first coupling portion,
   a backing portion adapted to abut against a caliper pin planted in said caliper body or a caliper tie-rod screwed to said caliper body avoiding coupling with said caliper pin or said caliper tie-rod,
   wherein said spring comprises at least one concave spring portion having a concavity facing towards said brake disc so that at least said backing portion is elastically movable in a radial direction towards said brake disc between a rest configuration and at least a work configuration, elastically stressing said first coupling portion and said second coupling portion along said tangential direction in opposite directions, in which, in said work configuration, said backing portion abuts against said caliper pin or said caliper tie-rod, stressing said first coupling portion and said coupling portion against said first side bridge and against said second side bridge, respectively.

2. The spring according to claim 1, comprising:
   a first spring arm adapted to connect said backing portion to said first coupling portion,
   a second spring arm adapted to connect said backing portion to said second coupling portion,
   wherein said first spring arm and said second spring arm diverge from said backing portion along first opposite directions, which are inclined with respect to said tangential direction and with respect to said radial direction forming said at least one concave spring portion, and wherein said spring is shaped so that, in said work configuration, said backing portion is constantly elastically biased in a radial direction abutting against said caliper pin or said caliper tie-rod and so that said first coupling portion and said second coupling portion are constantly elastically biased in a tangential direction against said caliper body, and wherein the concavity of said at least one concave spring portion decreases between said rest position and said work position.

3. The spring according to claim 2, comprising:

a third spring arm adapted to connect said first spring arm to said first coupling portion, a fourth spring arm adapted to connect said second spring arm to said second coupling portion, wherein said third spring arm and said fourth spring arm extend along second opposite directions that are inclined with respect to said tangential direction and to said radial direction, wherein at least said first spring arm and said third spring arm form a second convex spring portion having concavity that is opposite to said at least one concave spring portion, and wherein at least said second spring arm and said fourth arm form a third convex spring portion having concavity that is opposite to said at least one concave spring portion, and wherein the concavity of said second convex spring portion and the concavity of said third convex spring portion decrease between said rest position and said work position.

4. The spring according to claim 1, comprising:

at least a fifth spring arm adapted to connect said first thrust portion to said first coupling portion, at least a sixth spring arm adapted to connect said second thrust portion to said second coupling portion, and/or wherein said spring is constrained to said caliper body with said first coupling portion and said second coupling portion, and said spring is constrained to said caliper pin or to said caliper tie-rod with said backing portion exclusively forming three constraint areas;

and wherein said spring comprises a plane of symmetry, wherein said plane of symmetry is perpendicular to said tangential direction and symmetrically divides said spring in half, and wherein said first thrust portion and said second thrust portion are symmetrical to said backing portion;

and wherein said spring comprises a first connection portion from which said first spring arm and said third spring arm distance themselves, wherein at least one fifth spring arm is connected to said first connection portion supporting said first thrust portion so as to be placed orthogonal to said first spring arm and to said third spring arm, and wherein said spring comprises a second connection portion from which said second spring arm and said fourth spring arm distance themselves, wherein at least one sixth spring arm is connected to said second connection portion supporting said second thrust portion so as to be placed orthogonal to said second spring arm and to said fourth spring arm.

5. The spring according to claim 4, wherein said at least one fifth spring arm and said at least one sixth spring arm are folded in a U, and wherein said at least one fifth spring arm is shaped with two branches folded in a U each respectively connected to at least one of said at least one first thrust portion, and wherein said at least one sixth spring arm is shaped with two branches folded in a U each respectively connected to at least one of said at least one second thrust portion;

and wherein said first thrust portion and said second thrust portion, when in operating conditions resting on said at least one pad, is arranged inclined with respect to said axial direction and also with respect to said radial direction, forming a predetermined angle between said first thrust portion or said second thrust portion, and said axial direction and forming a predetermined angle between said first thrust portion, or said second thrust portion, and said radial direction.

6. The spring according to claim 1, wherein said spring body comprises at least one filiform spring body portion, or is filiform; or said spring body comprises at least one band-shaped portion or is completely band-shaped and is obtained from a shaped and bent sheared sheet of predetermined spring thickness which forms a spring edge; or said spring body is band-shaped and is obtained from a sheared and shaped sheet of spring steel.

7. The spring, according to claim 6, wherein said spring is a band spring, wherein said plate edge forms at least said first plate thrust portion and a different at least one first plate backing portion;

wherein said spring comprises at least one first abutment portion, wherein said first abutment portion is adapted to abut against said first plate backing portion of said at least one brake pad forming a support on an area of said first plate backing portion which prevents any sliding of said first thrust portion when the spring is subject to external actions;

preventing said spring from permanently coupling with said at least one pad, avoiding a bilateral constraint in said first thrust portion and said first abutment portion between said spring and said at least one pad;

and wherein said spring is a band spring, wherein said plate edge forms at least said second plate thrust portion and a different at least one second plate backing portion;

wherein said spring comprises at least a second abutment portion, wherein said second abutment portion is adapted to abut against said second plate backing portion of said at least one brake pad forming a support on an area of said second plate backing portion which prevents any sliding of said second thrust portion when the spring is subject to external actions;

preventing said spring from permanently coupling with said at least one pad, avoiding a bilateral constraint in said second thrust portion and said second abutment portion between said spring and said at least one pad;

and wherein said spring body comprises a first spring body band comprising at least said first coupling portion, said backing portion and said second coupling portion, a second spring body band comprising at least said first thrust portion, and a third spring body band comprising at least said second thrust portion, wherein said second spring body band and said third spring body band are connected to said first spring body band, so as to arrange said first thrust portion and said second thrust portion orthogonal to said first coupling portion, said backing portion and said second coupling portion; or wherein said spring body comprises a first spring body band, or a first spring body thread, comprising at least said first coupling portion, said backing portion and said second coupling portion, wherein said first spring body band is band-shaped or said first spring body thread is filiform;

a second spring body thread comprising at least said first thrust portion, wherein said second spring body thread is filiform, and a third spring body thread comprising at least said second thrust portion, wherein said third spring body thread is filiform, wherein said second spring body thread and said third spring body thread are connected to said first spring body band, so as to arrange said first thrust portion and said second thrust portion orthogonal to said first coupling portion, said backing portion and said second coupling portion.

8. A spring according to claim 7, wherein said first abutment portion extends in a cantilever fashion from said spring body;

and wherein said second abutment portion extends in a cantilever fashion from said spring body;

and wherein said first abutment portion comprises first abutment portion opposite flat faces and a first abutment portion edge and said first abutment portion rests abutting against said first plate backing portion with one of said first abutment portion opposite flat faces;

or said first abutment portion comprises first abutment portion opposite flat faces and a first abutment portion edge and said first abutment portion rests abutting against said first plate backing portion with said first abutment portion edge;

and wherein said second abutment portion comprises second abutment portion opposite flat faces and a second abutment portion edge and said second abutment portion rests abutting against said second plate backing portion with one of said second abutment portion opposite flat faces;

or said second abutment portion comprises second abutment portion opposite flat faces and a second abutment portion edge and said second abutment portion rests abutting against said second plate backing portion with said second abutment portion edge;

and wherein said first abutment portion, when it rests abutting against said first plate backing portion, is stressed to bend;

and wherein said second abutment portion, when it rests abutting against said plate backing portion, is stressed to bend;

and wherein said first abutment portion extends in a cantilever fashion from at least a fifth spring arm;

and wherein said second abutment portion extends cantilever fashion from at least a sixth spring arm.

9. A spring assembly and brake pad comprising:

at least one spring according to claim 1, and at least one brake pad comprising a support plate, to which a friction material is supported, said support plate comprising a plate edge which forms at least one first plate thrust portion and at least one second plate thrust portion.

10. A brake caliper assembly, comprising:

at least one spring assembly and pad according to claim 9, and a brake caliper comprising a caliper body adapted to be arranged straddling a brake disc, said brake disc being adapted to rotate about a rotation axis, which defines an axial direction, parallel to said rotation axis, a radial direction, orthogonal to said rotation axis, and a tangential direction orthogonal both to said axial direction and to said radial direction;

said caliper body comprising a first elongated element or wheel side elongated element, a second elongated element or opposite wheel side elongated element, a first side bridge and a second side bridge adapted to connect said first elongated element to said second elongated element so as to straddle said brake disc, leaving a central portion of said caliper body free from a central connection bridge, and wherein said caliper body comprises seats adapted to support thrust elements or pistons configured to stress said at least one pad towards said brake disc, at least one pad sliding and support pin connected to said caliper body and supporting said at least one brake pad, said brake caliper assembly further comprising:

a caliper pin planted in said caliper body in said central portion of caliper body between said first elongated element and said second elongated element, or a caliper tie-rod screwed into said caliper body in said central portion of caliper body between said first elongated element and said second elongated element, wherein said spring has said backing portion abutting against said caliper pin or said caliper tie-rod and stressed in a radial direction, and wherein said spring has said first coupling portion and said second coupling portion coupled with said first side bridge and said second side bridge and stressed in a tangential direction against said first side bridge and against said second side bridge, respectively.

11. The spring according to claim 1, wherein said backing portion is folded in a U forming a first spring convex spring portion having opposite concavity to said at least one concave spring portion adapted to abut against said caliper pin or said caliper tie-rod, wherein said first convex spring portion divides said at least one concave spring portion into a first concave spring portion and a second concave spring portion, and/or wherein said spring comprises a first folded portion and a second folded portion, which are directly connected to said backing portion on opposite sides along said tangential direction forming at least one portion of said at least one concave spring portion, and wherein said backing portion comprises a radially external backing surface facing in a radial direction in an opposite direction to said brake disc, said radially external backing surface being adapted to abut against said caliper pin or said caliper tie-rod, and wherein the concavity of said backing portion folded in a U, between said rest configuration and said work configuration, increases so as to tighten said backing portion against said caliper pin or said caliper tie-rod;

and wherein said first coupling portion is shaped so as to snap couple with said caliper body;

and wherein
said second coupling portion is shaped so as to snap couple with said caliper body;
and wherein said first coupling portion is shaped so as to couple with said caliper body forming a bilateral constraint of the spring with the caliper body;
and wherein
said second coupling portion is shaped so as to couple with said caliper body forming a bilateral constraint of the spring with the caliper bod.

* * * * *